O. E. MICHAUD.
BALL BEARING.
APPLICATION FILED DEC. 23, 1907.
No. 906,258.
Patented Dec. 8, 1908.
2 SHEETS—SHEET 1.
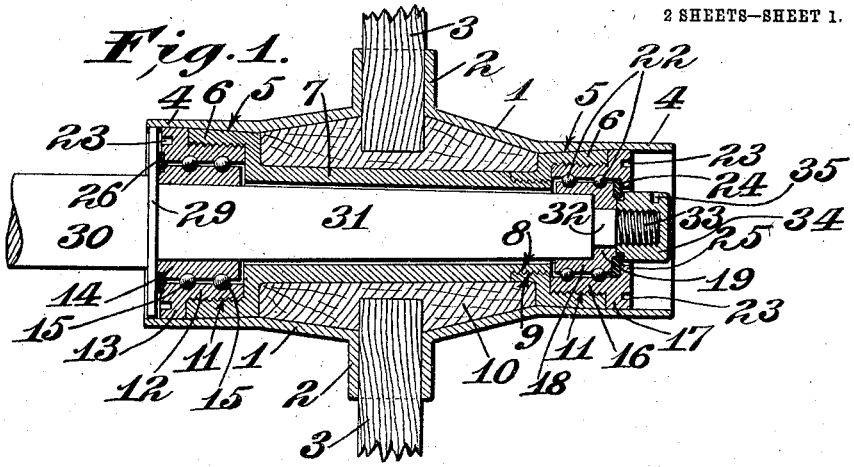
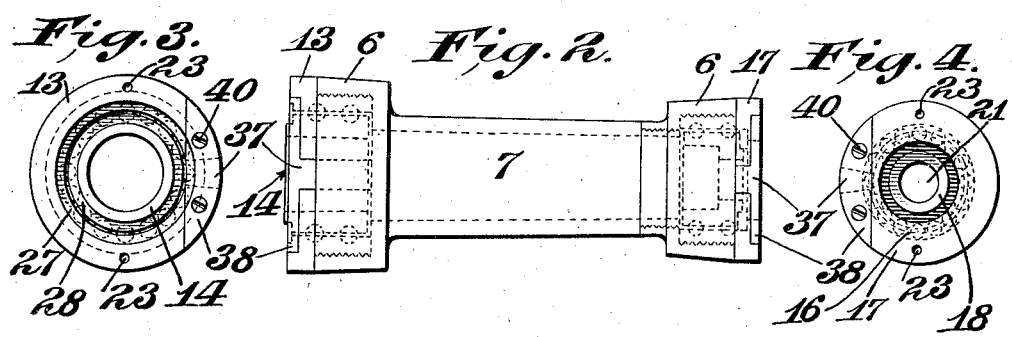
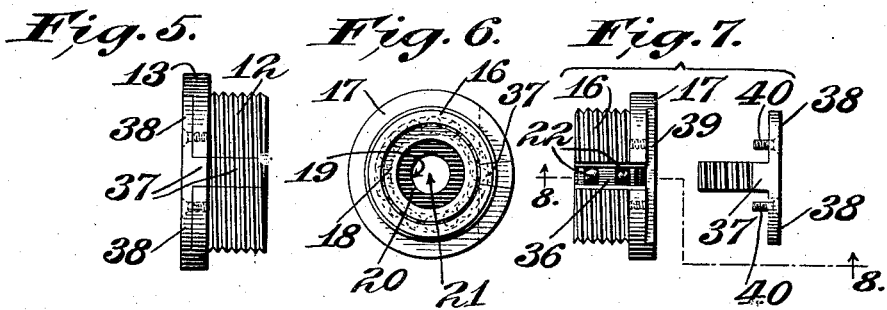
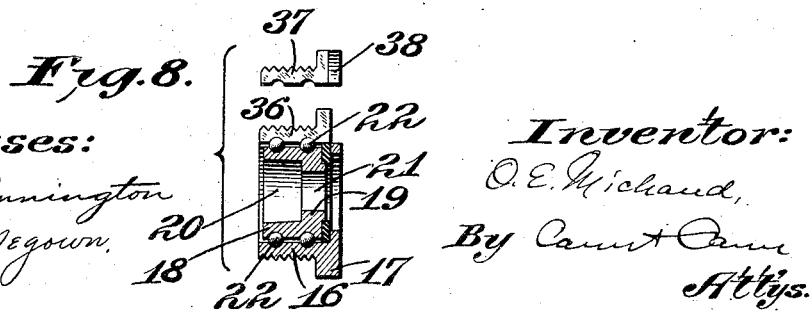
Witnesses:
G. A. Pennington
J. B. Megown
Inventor:
O. E. Michaud,
By Caunt+Caunt
Attys.

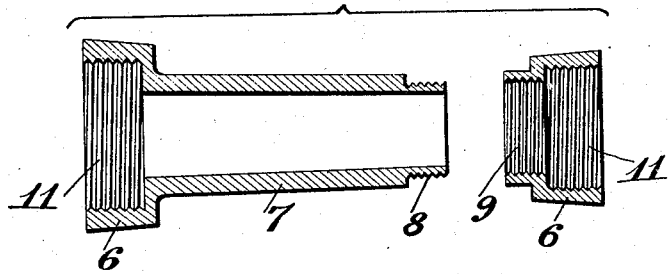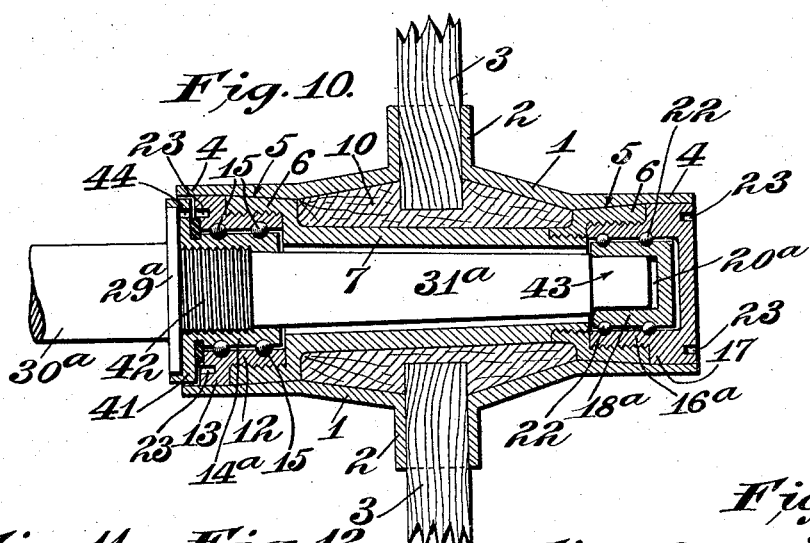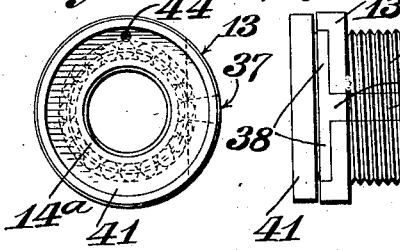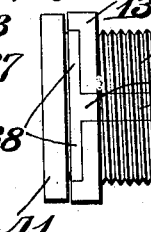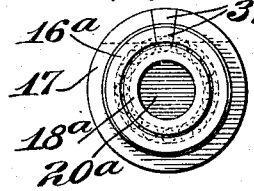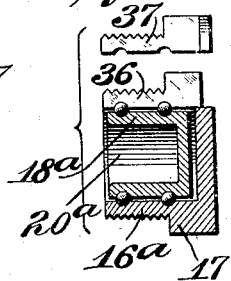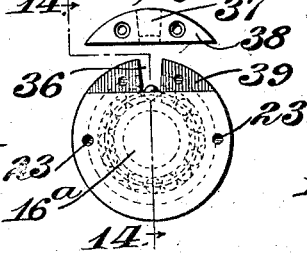

UNITED STATES PATENT OFFICE.

ONESIME E. MICHAUD, OF ST. LOUIS, MISSOURI.

BALL-BEARING.

No. 906,258.  Specification of Letters Patent.  Patented Dec. 8, 1908.

Application filed December 23, 1907. Serial No. 407,695.

*To all whom it may concern:*

Be it known that I, ONESIME E. MICHAUD, a citizen of the United States, and a resident of the city of St. Louis and State of Missouri, have invented a new and useful Improvement in Ball-Bearings, of which the following is a specification.

This invention relates to antifriction bearings and more particularly to ball-bearings for vehicle wheels.

It has for its principal objects to provide for the application of antifriction bearings to ordinary vehicle wheel hubs with only slight alteration of the hub or axle spindle; to simplify the construction and to minimize the number of adjustments of the parts of such bearings; to provide for the removal of the axle spindle without disturbing the bearings; to avoid dragging and to secure a true rolling movement of the balls in their bearings; and to attain certain other advantages hereinafter more fully set forth.

The invention consists in the parts and in the arrangements and combinations of parts hereinafter described and claimed.

In the accompanying drawings, which form part of this specification and wherein like symbols refer to like parts wherever they occur, Figure 1 is a longitudinal section of a wheel hub showing one form of my invention applied thereto; Fig. 2 is a side view of a spindle-sleeve and ball-bearings detached from the hub; Figs. 3 and 4 are end views thereof; Fig. 5 is a side view of one of the ball-bearings detached from the spindle-sleeve; Fig. 6 is an end view of the opposite ball-bearing; Fig. 7 is a side view of the opposite ball-bearing with its ball-retaining block detached; Fig. 8 is a section on the line 8—8 of Fig. 7; Fig. 9 is a longitudinal section of the spindle-sleeve detached from the hub; Fig. 10 is a longitudinal section of a wheel hub showing a modification of my invention; Fig. 11 is an end view of one of the ball-bearings of Fig. 10 detached from the spindle-sleeve; Fig. 12 is a side view thereof; Fig. 13 is an end view of the opposite ball-bearing; Fig. 14 is a section thereof on the line 14—14 of Fig. 15; and Fig. 15 is an end view of the same bearing with its ball-retaining block detached.

Referring more particularly to Figs. 1 to 9, inclusive, the hub of the wheel preferably comprises an outer metallic shell or casing 1. This casing is provided with radial socket portions 2 which are adapted to receive the wheel spokes 3. The end portions 4 of the casing 1 are circular. Preferably, the interior faces of said circular end portions are tapered slightly as at 5, so as to provide outwardly flaring circular pockets or seats for counterpart end portions 6 of a spindle sleeve or axle box 7. This spindle-sleeve is made in two separable sections. Preferably, the sleeve portion of one of said sections is elongated and it is provided with external screw threads 8 at its end which are adapted to fit internal threads 9 in the short sleeve portion of the other section. By this arrangement, the spindle sleeve 6 may be easily secured in the hub by inserting the sleeve sections inwardly from the respective ends of the hub and screwing said sleeve sections together until their tapered portions 6 are drawn tightly into the flaring seats 5 provided therefor in the circular end portions of the hub casing 1. The space between the hub casing 1 and the spindle-sleeve 7 is preferably filled in with a wooden or other suitable filler 10. The spindle-sleeve 7 is provided at each end with internal screw-threaded sockets 11. These sockets are adapted to receive the respective antifriction bearings.

In the construction illustrated in Figs. 1 to 9, inclusive, the antifriction bearing at the inner end of the hub comprises an externally threaded outer bearing ring 12 which is provided with an annular shoulder 13. This bearing ring is adapted to be screwed tightly into the threaded socket 11 so as to rotate with the hub of the wheel. An inner bearing ring 14 is preferably provided on its outer cylindrical face with two grooves or raceways which are arranged to coöperate with annular raceways formed on the interior cylindrical face of the outer bearing ring 12. In the raceways thus formed are antifriction balls 15. The antifriction bearing at the outer end of the hub is somewhat similar to the one just described. It comprises an outer bearing ring 16 which is externally screw-threaded and provided with an annular shoulder 17. Its coöperating inner bearing ring 18 is provided with an inwardly disposed flanged portion 19, so as to provide an internal shoulder and to constitute a pocket 20 having a reduced opening 21. This bearing is also preferably provided with two annular raceways for balls 22. The end faces of the respective bearing rings 12 and 16 are provided with holes 23 or other suitable means for the attachment of a spanner or wrench. The outer antifriction bearing is provided with a washer or packing ring 24. This packing ring is preferably fitted in an annular peripheral depression in the end of the bearing ring 18 and it is held in place by an inwardly disposed annular shoulder 25 on the bearing ring 16. A similar packing ring 26 is provided for the inner bearing. It is fitted in correlated annular depressions 27 and 28 in the end faces of bearing rings 12 and 14, respectively. This packing ring 26 is held in place by a collar or shoulder 29 on the axle 30. The axle shown is provided with a slightly tapered spindle 31. This spindle has a reduced end portion 32 which is screw-threaded, as at 33 to receive a securing nut 34. Preferably, this nut is circular in cross section and its end is closed, as shown. A hole or notch 35 is provided in the nut for the engagement of a special spanner or wrench. Obviously, however, the nut 34 may be of any other desirable form.

In order to minimize the number of parts and avoid numerous adjustments thereof, as well as to facilitate the placing of the balls in the bearings, the outer bearing rings 12 and 16 are slotted lengthwise as shown at 36 in Figs. 7 and 8. These slots 36 are of a sufficient width to permit the free passage of the bearing balls therethrough. Preferably, the slots are slightly tapered or flared outwardly. Segmental wedge-shaped filler or ball retaining blocks 37 are provided to fit said slots, and the outer faces of said filler blocks are curved and screw threaded to correspond with the external threaded portions of said bearing rings 12 and 16. These segmental filler blocks are preferably provided with winged portions 38 which are arranged to fit counterpart depressions or seats 39 formed in the end faces of the respective bearing rings 12 and 16. The blocks 37 may be held in place by screws 40 which may be conveniently inserted through holes in the winged portions and secured in the ends of the respective bearing rings. When the bearing rings 12 and 16 are screwed into place in the spindle-sleeve, the filler blocks 37 are held securely in place with their respective bearing rings. Thus, when the bearings are assembled and placed in the spindle-sleeve the outer rings and filler blocks are as one integral piece. This construction and arrangement greatly reduces the number of parts. Hence the number of adjustments is lessened and the bearing is made more stable. The bearings thus arranged are readily interchangeable and the arrangement of the raceways is such that the balls have a true rolling movement.

By providing two raceways for each bearing, as shown, the balls and their bearings are not subjected to a rocking motion. Therefore, the bearings may be used for a long time, because undue wear is avoided. Furthermore, in case a bearing should become damaged it may be readily replaced.

Bearings constructed and arranged according to my invention may be easily adapted to ordinary wheel hubs by a slight alteration of such hubs. For example, it is only necessary to bore a wooden wheel hub to fit the spindle sleeve 7, and possibly insert metal rings or bushings in the ends of the hub to provide seats equivalent to the circular portions 4 and tapered seats 5 shown in the drawings. It is also obvious that hubs equipped with the bearings may be readily applied to ordinary axle spindles with little or no alteration whatever.

As shown in Fig. 1, the shouldered end portion 32 of the spindle 31 is fitted into the pocket 20 of the inner bearing ring 18, and it is clamped tightly thereto by the nut 34. Obviously, it is only essential that the distance between the collar or shoulder 29 and shoulder formed by the reduced end portion 32 of the spindle 31, should be sufficient to prevent binding and to permit of the proper alinement of the ball raceways when the nut 34 is jammed against the ring 18. In case the spindle is too short, it is only necessary to interpose a washer or liner between the shouldered end of the spindle and the seat of the pocket 20. So, too, if the spindle is too long, a washer or liner may be placed between the collar or shoulder 29 and bearing ring 14.

In the modification illustrated in Figs. 10 to 15, inclusive, the general arrangement is similar to that hereinbefore set forth. In this case, the inner bearing ring 14$^a$ is preferably provided with an annular shoulder 41 and it is hollowed to receive the collar 29$^a$ on the axle 30$^a$. The spindle 31$^a$ is provided with a screw-threaded portion 42 which is adapted to be screwed tightly into an interiorly screw-threaded portion of the bearing ring 14$^a$. The end of the spindle 31$^a$ is preferably reduced as at 43 so as to fit into the pocket 20$^a$ of the inner bearing ring 18$^a$. The outer end of this ring is closed, as is also the outer end of the outer bearing ring 16$^a$. To conveniently attach or detach the inner bearing, the ring 14$^a$ is provided with a hole 44 through its shoulder 41 and arranged so as to register with one of the holes 23 in the bearing ring 12, in order that a projection on a wrench may be inserted into said hole 23. In other respects the construction and arrangements are identical.

Obviously, the device admits of considerable modification without departing from my invention, and, therefore, I do not wish to be limited to the exact constructions and arrangements shown.

What I claim as my invention and desire to secure by Letters Patent is:

1. An antifriction bearing comprising a spindle-sleeve having a socket portion at each end, and spindle-bearings fitted in said socket portions each comprising an outer and an inner bearing ring, the adjacent coöperating faces of said bearing rings being provided with continuous registering grooves to constitute raceways, antifriction devices in said raceways, said outer bearing rings having segmental open portions to permit access to the raceways, and complementary segmental members adapted to complete the continuity of said raceways and the outer faces of said outer rings, said outer rings and their respective segmental members being arranged to be held intact by the socket portions of said spindle-sleeve.

2. An antifriction bearing comprising a spindle-sleeve having a screw-threaded socket portion at each end, and spindle bearings fitted in said socket portions each comprising an outer and an inner bearing ring, the adjacent coöperating faces of said bearing rings being provided with continuous registering grooves to constitute raceways, antifriction devices in said raceways, said outer bearing rings having segmental open portions to permit access to the raceways, and complementary segmental members adapted to complete the continuity of said raceways and the outer faces of said outer rings, the outer face of the completed outer rings being screw-threaded to fit the socket portions of said spindle sleeve.

3. An antifriction bearing comprising a spindle-sleeve having outwardly flaring end portions adapted to fit counterpart sockets in a wheel hub, said spindle-sleeve also having a socket at each end, and spindle-bearings fitted in said sockets each comprising an outer and an inner bearing ring, the adjacent coöperating faces of said bearing rings having continuous registering grooves to constitute raceways, and the inner ring of one of said spindle-bearings being arranged for the attachment of an axle-spindle thereto, and antifriction devices in said raceways.

4. An antifriction bearing comprising a spindle-sleeve having separable members provided with outwardly flaring outer end portions adapted to fit counterpart sockets in a wheel hub, the separable members of said spindle-sleeve being adjustably connected, and the outer end portions thereof having screw-threaded sockets therein, and spindle-bearings fitted in said spindle-sleeve sockets each comprising an outer and an inner bearing ring, said bearing rings having continuous registering grooves in their adjacent coöperating faces to constitute raceways, the inner ring of one of said bearings being arranged for the attachment of an axle spindle thereto, and the outer bearing rings having segmental open portions to permit access to said raceways, antifriction devices in said raceways, and complementary segmental members arranged to close said openings and to complete the continuity of said raceways and the outer faces of said outer bearing rings, and said completed outer rings being screw-threaded to fit said spindle-sleeve sockets, substantially as and for the purpose specified.

5. An antifriction bearing comprising a spindle-sleeve provided with a socket at each end, and spindle-bearings fitted in said sockets each comprising outer and inner bearing rings, the adjacent coöperating portions of said bearing rings having a plurality of continuous registering grooves to constitute a plurality of raceways for each bearing, and said outer bearing rings having segmental open portions to permit access to said raceways, a series of antifriction devices in each of said raceways, and complementary members arranged to close the open portions of said outer rings to complete the continuity of said raceways and the outer faces of said outer bearing rings.

6. An antifriction bearing comprising a spindle-sleeve provided with a socket at each end, and spindle-bearings fitted in said sockets each comprising outer and inner bearing rings, the adjacent coöperating portions of said bearing rings having a plurality of continuous registering grooves to constitute a plurality of raceways for each bearing, and said outer bearing rings having segmental open portions to permit access to said raceways, a series of antifriction devices in each of said raceways, complementary members arranged to close the open portions of said outer rings to complete the continuity of said raceways and the outer faces of said outer bearing rings, and one of said inner bearing rings being arranged for the attachment of an axle-spindle thereto.

ONESIME E. MICHAUD.

In presence of—
   JAMES A. CARR,
   G. A. PENNINGTON.